United States Patent
Knutson et al.

(10) Patent No.: US 8,749,920 B1
(45) Date of Patent: Jun. 10, 2014

(54) MAGNETIC RECORDING HEAD WITH DYNAMIC FLY HEIGHT HEATING AND HAVING THERMALLY CONTROLLED POLE TIP PROTRUSION TO CONTROL AND PROTECT READER ELEMENT

(75) Inventors: Neil Knutson, Fremont, CA (US); David E. Fowler, San Jose, CA (US); Yu Lo, Foster City, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 122 days.

(21) Appl. No.: 13/328,688

(22) Filed: Dec. 16, 2011

(51) Int. Cl.
G11B 5/127 (2006.01)

(52) U.S. Cl.
USPC .................. 360/125.31; 360/125.74

(58) Field of Classification Search
USPC .............. 360/125.3, 125.31, 125.74
See application file for complete search history.

(56) References Cited

U.S. PATENT DOCUMENTS

| | | | |
|---|---|---|---|
| 6,324,036 B1 | 11/2001 | Dill, Jr. et al. | |
| 6,493,183 B1 | 12/2002 | Kasiraj et al. | |
| 6,661,605 B1 | 12/2003 | Pust et al. | |
| 6,700,752 B2 | 3/2004 | Dimitrov et al. | |
| 6,842,308 B1 | 1/2005 | Pust et al. | |
| 6,859,343 B1 | 2/2005 | Alfoqaha et al. | |
| 6,909,578 B1 | 6/2005 | Missell et al. | |
| 6,940,693 B2 * | 9/2005 | Lille et al. | 360/125.06 |
| 6,963,474 B2 | 11/2005 | Yoshida et al. | |
| 6,972,919 B2 | 12/2005 | Suk | |
| 6,999,265 B1 | 2/2006 | Schreck et al. | |
| 7,031,122 B2 | 4/2006 | Pust et al. | |
| 7,046,473 B2 | 5/2006 | Fu et al. | |
| 7,064,930 B2 | 6/2006 | Serpe et al. | |
| 7,068,468 B2 | 6/2006 | Kamijima | |
| 7,092,193 B1 | 8/2006 | McKenzie et al. | |
| 7,190,543 B2 | 3/2007 | Suk | |
| 7,239,481 B2 | 7/2007 | Lille et al. | |
| 7,330,336 B2 | 2/2008 | Luo et al. | |
| 7,372,665 B1 | 5/2008 | Stoev et al. | |
| 7,397,625 B2 | 7/2008 | Lille | |
| 7,400,473 B1 | 7/2008 | Krajnovich et al. | |
| 7,403,354 B2 | 7/2008 | Pust et al. | |
| 7,542,246 B1 | 6/2009 | Song et al. | |
| 7,573,682 B2 | 8/2009 | Pust et al. | |
| 7,589,928 B2 * | 9/2009 | Roy et al. | 360/75 |
| 7,593,183 B2 | 9/2009 | Hsiao et al. | |
| 7,623,322 B2 | 11/2009 | Umehara et al. | |
| 7,643,247 B2 * | 1/2010 | Sano et al. | 360/128 |
| 7,684,145 B2 * | 3/2010 | Drent et al. | 360/97.11 |
| 7,701,676 B2 * | 4/2010 | Kubotera et al. | 360/294.7 |
| 7,729,086 B1 * | 6/2010 | Song et al. | 360/125.31 |
| 7,796,356 B1 | 9/2010 | Fowler et al. | |
| 7,800,858 B1 | 9/2010 | Bajikar et al. | |
| 7,898,767 B2 * | 3/2011 | Yamanaka et al. | 360/125.31 |

(Continued)

Primary Examiner — Brian Miller

(57) ABSTRACT

A magnetic recording device includes a slider having an air bearing surface (ABS), a leading side, and a trailing side and a head residing on the slider. The head has a first magnetic transducer and a first heater for heating an area proximal to the first magnetic transducer. A first shield (S1) comprising a first material is on the leading side of the first magnetic transducer and a second shield (S2) comprising the first material is on the trailing side of the first magnetic transducer. A first pole (P1) comprising the first material is on the trailing side of the second shield (S2), and the first pole (P1) is between 0.6 micron and 2.0 micron thick; and the second shield (S2) is less than 0.6 micron thick. A hard disk drive includes the magnetic recording device.

17 Claims, 3 Drawing Sheets

(56) References Cited

U.S. PATENT DOCUMENTS

| | | | |
|---|---|---|---|
| 7,957,085 B2* | 6/2011 | Tanaka et al. | 360/59 |
| 8,004,794 B2 | 8/2011 | Zhou et al. | |
| 8,149,541 B2 | 4/2012 | Baumgart et al. | |
| 8,203,804 B2* | 6/2012 | Taguchi et al. | 360/125.31 |
| 8,295,010 B2* | 10/2012 | Shimazawa et al. | 360/125.31 |
| 8,351,157 B2* | 1/2013 | Nishioka et al. | 360/125.31 |
| 2002/0176208 A1 | 11/2002 | Serpe et al. | |
| 2003/0081359 A1 | 5/2003 | Pust et al. | |
| 2003/0099054 A1 | 5/2003 | Kamijima | |
| 2004/0012894 A1 | 1/2004 | Pust et al. | |
| 2004/0027719 A1 | 2/2004 | Gider et al. | |
| 2004/0075944 A1 | 4/2004 | Macken et al. | |
| 2004/0201920 A1* | 10/2004 | Koide et al. | 360/128 |
| 2004/0240109 A1 | 12/2004 | Hamann et al. | |
| 2005/0046995 A1 | 3/2005 | Lille | |
| 2005/0052773 A1 | 3/2005 | Suk | |
| 2005/0254171 A1* | 11/2005 | Ota et al. | 360/128 |
| 2005/0264949 A1 | 12/2005 | Gao et al. | |
| 2006/0028754 A1 | 2/2006 | Suk | |
| 2006/0028764 A1 | 2/2006 | Lille | |
| 2006/0034014 A1 | 2/2006 | Kato et al. | |
| 2006/0171056 A1 | 8/2006 | Suk | |
| 2007/0019325 A1* | 1/2007 | Shimizu et al. | 360/126 |
| 2007/0188919 A1 | 8/2007 | Kobayashi | |
| 2007/0230010 A1* | 10/2007 | Jin et al. | 360/69 |
| 2007/0236836 A1 | 10/2007 | Kurita et al. | |
| 2007/0247750 A1 | 10/2007 | Hsiao et al. | |
| 2007/0247758 A1 | 10/2007 | Kurita et al. | |
| 2008/0019041 A1 | 1/2008 | Aoki | |
| 2008/0043372 A1 | 2/2008 | Shimozato | |
| 2008/0068762 A1 | 3/2008 | Kobayashi et al. | |
| 2008/0225426 A1 | 9/2008 | Roy et al. | |
| 2009/0103208 A1 | 4/2009 | Aoki et al. | |
| 2009/0262460 A1 | 10/2009 | Hanchi et al. | |
| 2009/0279207 A1 | 11/2009 | Sasaki et al. | |
| 2010/0097721 A1 | 4/2010 | Baumgart et al. | |

* cited by examiner

MAGNETIC RECORDING HEAD WITH DYNAMIC FLY HEIGHT HEATING AND HAVING THERMALLY CONTROLLED POLE TIP PROTRUSION TO CONTROL AND PROTECT READER ELEMENT

BACKGROUND OF THE INVENTION

Disk drives typically use heads residing on sliders to read from and write to the magnetic media. Read and write transducers residing in the head are flown at a small, controlled spacing above the magnetic medium during read and write operations. An air bearing forms between the head and the disk due to the disk rotating at high speeds. It may be desirable to estimate a fly height of the head, for example, when a system controls the fly height in order to optimize the write/read signals. To determine the controlled spacing, it may be desirable for the disk drive to detect at what point the head contacts the media, known as a touchdown event. Touchdown sensing may be accomplished by detecting actual contact or by proximity sensing methods. In addition, touchdown may be determined without dedicated sensors, for example using readback signal from the read transducer, position error signal (PES) from the servo, or other means.

For example, heads may use a thermal actuator that generates heat to control the head-media spacing. Heat generated by the thermal actuator causes local thermal expansion of the head, which locally reduces the spacing between the head and magnetic media. The thermal actuator can be driven to induce sufficient heating for contact or touchdown between the head and media. This touchdown is intentional and may be performed on each drive during initial drive calibration, or periodically during normal operation.

Thermal actuators cause touchdown and sensors detect touchdown; however, this does not ensure that the point where touchdown is made is actually sensed at the same location, or sensed at the desired location, or is well correlated to the read/write transducers fly height. In one example, touchdown may occur while the read sensor is still well above the surface, resulting in sub-optimal read signal. In another example, touchdown may occur at the read sensor first and cause damage to the read sensor.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
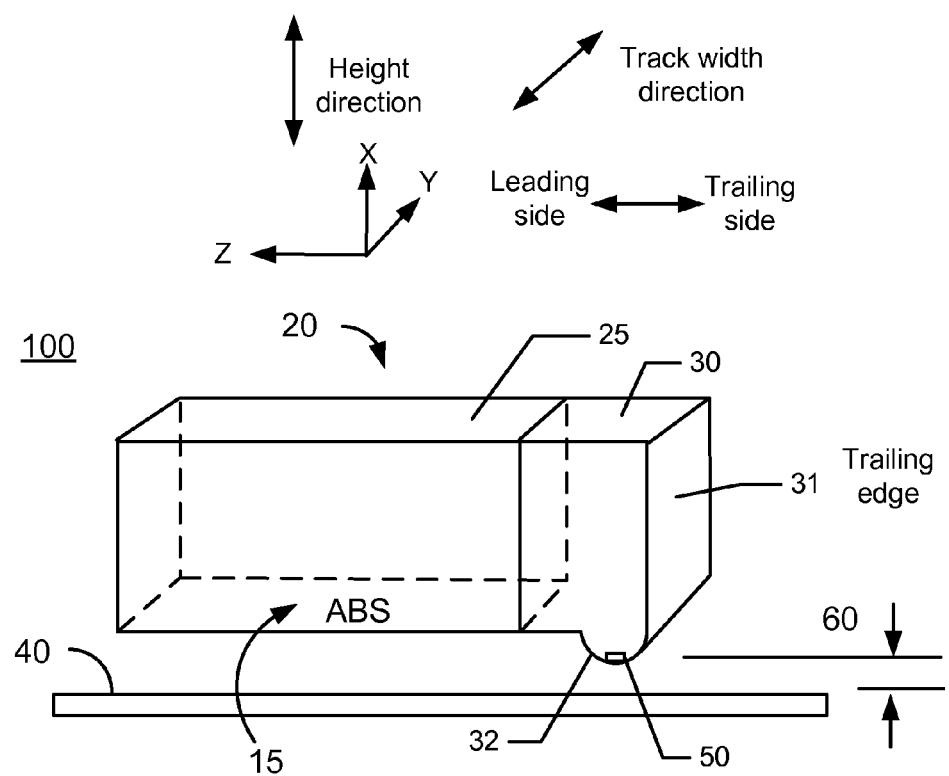
FIG. 1 illustrates a hard disk drive, in accordance with one aspect of the subject invention.

FIG. 1 illustrates a hard disk drive (HDD) 100 that includes a slider 20 and recording media 40. Slider 20 includes body 25 and a magnetic recording head 30 on the trailing side of body 25. Body 25 may be much larger than magnetic recording head 30, and figures are highly simplified for clarity. Slider 20 has a bottom surface 15, hereinafter called an air bearing surface (ABS), which faces recording media 40. During operation, recording media 40 rotates under slider 20, and due to aerodynamic forces generated between ABS 15 and recording media 40, floats a fly height distance 60 above media 40. Recording head 30 includes a write transducer 50, which may be mounted in proximity to trailing edge 31 of magnetic recording head 30 facing ABS 15. Fly height 60 may be measured as the distance between the nearest part of write transducer 50 and media 40. A heater (not shown) may be incorporated into head 30 that causes expansion forming bulge 32 of a portion of ABS surface 15. By controlling the amount of heating, bulge 32 can be controlled to adjust the fly height 60.

Figure 2:
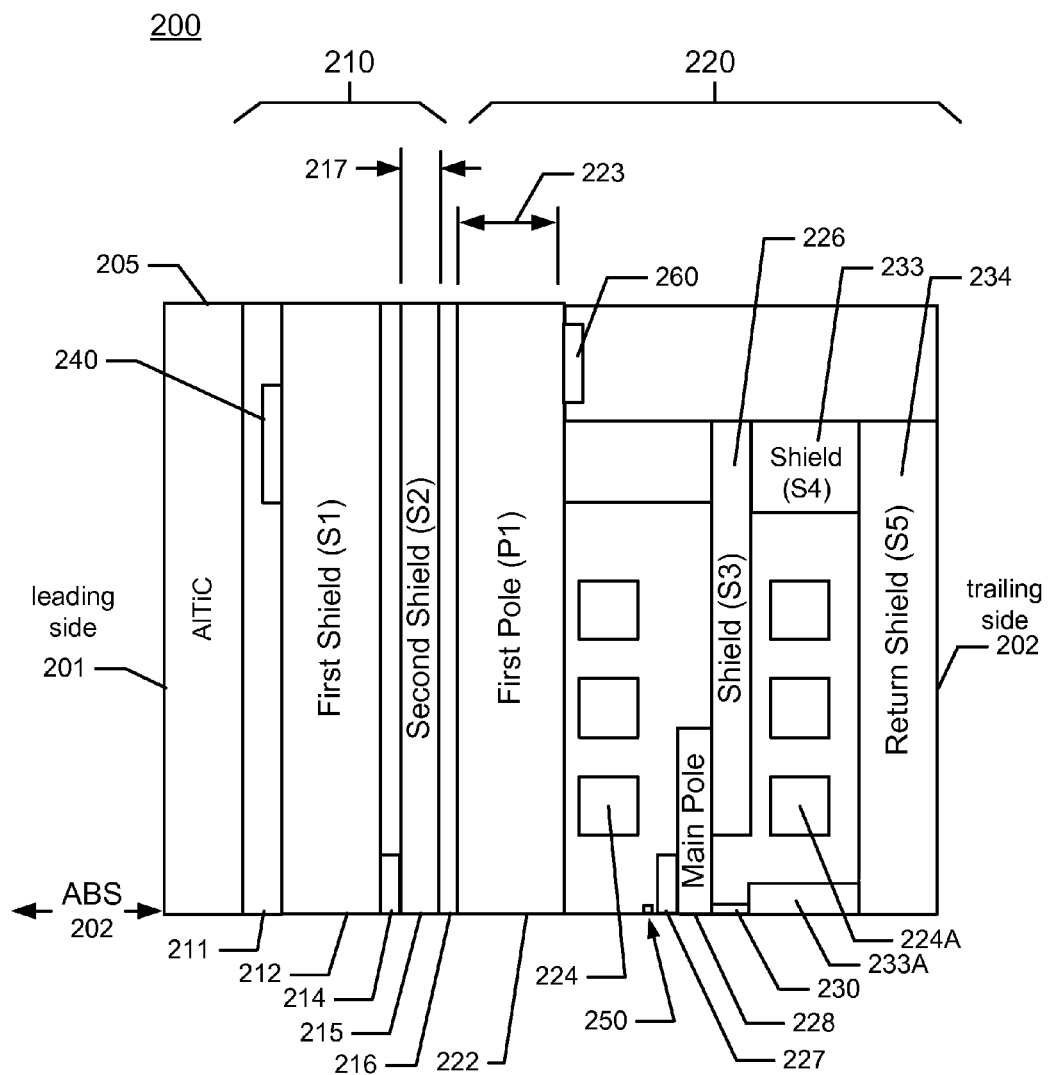
FIG. 2 illustrates a cross section of a portion of a perpendicular magnetic recording head, in accordance with one aspect of the subject invention.

FIG. 2 illustrates a cross section of a portion of a perpendicular magnetic recording (PMR) head 200. The PMR head 200 is described in the context of particular components and layers. However, in some embodiments, such layers may include sub-layer(s). In addition, some components may be moved, omitted, or combined with other components. Some embodiments may be used with any type of touchdown sensing or without touchdown sensing, and are not dependent on the type of sensing employed. For clarity, components of PMR head 200 are simplified, and in addition, FIG. 2 is not drawn to scale.

Referring to FIGS. 1-2, the PMR head 200 may reside on the slider 20 of HDD 100. PMR head 200 has a leading side 201, trailing side 202, and bottom surface ABS 203. ABS 203 faces the recording media 40. The PMR head 200 includes a magnetic read transducer 210 and write transducer 220. Slider 20 may be very large in comparison to the PMR head 200, and only a portion 205 of slider 20 is shown in FIG. 2. Slider 20 may comprise AlTiC or other suitable material.

The read transducer 210 is used in reading from the media 40. The read transducer 210 includes first shield (S1) 212, second shield (S2) 215, spacer layer 216 and read sensor 214. The read sensor 214 may include a giant magnetoresistive sensor, such as a tunneling magnetoresistive junction. However, in other embodiments, the read sensor 214 may include other and/or additional components. In one embodiment, S2 215 may be recessed from the ABS. A first heater 240 is on the leading side of S1 212, and may be distal from the ABS; and may be formed in an intermediate layer 211. The first heater 240 acts as a thermal actuator to control the shape of the head 200 in the proximity of S1 212 at the ABS.

The write transducer 220 is used in writing to the media 40. The write transducer 220 includes a first pole (P1) 222, third shield (S3) 226 also sometimes referred to as an auxiliary pole, main pole 228, write gap 230, coils 224 and 224A, and return shield (S5) 234. Write transducer also includes a fourth shield (S4) 233 and 233a, and leading shield 227. Write transducer 220 also includes a touchdown sensor 250 that may be close to the ABS and near the main pole 228. The write transducer 220 may include other and/or additional components. In addition, one or more portions of the write transducer 220 might be omitted in various embodiments.

The first heater 240 may be used to induce touchdown or fly height adjustments, and otherwise control the spacing of the head 200 to the media 40. For example, a current may be driven through the first heater 240, which generates heat in the region of the transducers 210 and 220. As a result, the transducers 210 and/or 220 may bulge outward toward the media 40, as shown in FIG. 1. When enough heat is generated by the first heater 240, sufficient thermal protrusion occurs for intentional touchdown. This touchdown may be sensed by the touchdown sensor 250 or other means of touchdown detection. Once touchdown is detected using the touchdown sensor 250, the first heater 240 may be driven at a lower power in order to provide that there is a desired space between the PMR head 200 and media 40. Thus, use of the thermal actuator 240 allows the fly height to be selected and controlled.

In one embodiment, a second heater 260 may be included in PMR head 200. Second heater 260 may be on a trailing side of first pole (P1) 222 and may be located at a position distal from the ABS. In one embodiment, the first heater 240 may be used for read operations and the second heater 260 may be used for write operations. In one embodiment, first heater 240 and second heater 260 may be used in combination.

In one embodiment, first heater 240 may be used as a thermal actuator to control fly height of read transducer 214 above the media 40. Heat will conduct through S1 212 toward the ABS 202 and cause S1 212 to bulge toward the ABS 202. Since read transducer 214 is adjacent S1 212, the read transducer 214 fly height will also be actuated toward the ABS 202. When first heater 240 is actuated, touchdown sensor 250 may be used to detect proximity or contact to the media 40. Since touchdown sensor 250 is separated from read transducer 214 by layers S1 212, S2 215, P1 222, and other layers, there is a possibility that the heat actuation in the vicinity of the read transducer 214 will be different than the heat actuation in the vicinity of the touchdown sensor 250 due to different thermal conduction paths and material properties. This may be particularly true in the transient state when changes to power applied to the first heater 240 are made. During this time, it may be desirable to prevent the read transducer 214 from making any physical contact with the media that might damage read transducer 214.

In one embodiment, contact of the read transducer with the media may be prevented by ensuring that another portion of the PMR head 200 will always contact the media first. This, however, may not be a sufficient criterion; since a high degree of correlation between the touchdown contact location and the read transducer 214 may be needed to control the thermal actuation throughout the dynamic and static phases of operation.

To provide a high degree of correlation between the thermal actuation in the vicinity of the read transducer 214 and the touchdown contact location, and to prevent the read transducer 214 from being the first area to contact the media during actuation, the thermal conduction originating from first heater 240 should be carefully controlled.

In one embodiment, thermal actuation of the read transducer 214 may be provided by controlling thermal flow in a manner to provide that P1 222 will have the greatest thermal protrusion, and provide that S2 215 has a thermal protrusion closely correlated to, but less than P1 222.

To provide a controlled thermal path to P1 222, and thermal actuation of P1 222, the thickness 217 of S2 215 and the thickness 223 of P1 222 are selected to provide that P1 222 has slightly greater thermal protrusion than S1 212 and read transducer 214; thereby simultaneously providing mechanical protection to the read transducer 214 and closely correlated fly height.

In one embodiment, the materials comprising S1 212, S2 215 and P1 222 are selected to have the same material with limited composition variance. One advantage of controlling the composition variance of the layers is to provide an ABS with layers that will respond to similarly to lapping and etching processes, and thereby provide controlled recessions and initial ABS profiles. This controlled composition variance provides a further measure of correlation of thermal actuation between the various layers of the PMR head 200.

In one embodiment P1 222 has a thickness 223 that may be between 0.6 micron and 2 microns, and S2 215 has a thickness 217 that may be less than 0.6 micron. In another embodiment, S2 215 has a thickness 217 that may be less than 0.3 micron. In another embodiment, S2 215 has a thickness 217 that may be less than one half the thickness 223 of P1 222.

In one embodiment, S2 215 and P1 222 comprise a first material containing nickel/iron (NiFe). In one embodiment S2 215 and P1 222 comprise a first material NiFe wherein iron comprises between 17% and 23% of the first material. In one embodiment, S2 215 and P1 222 comprise a first material NiFe wherein iron comprises between 17% and 23% of the first material and the iron content is constant within 3% of the first material.

Figure 3:
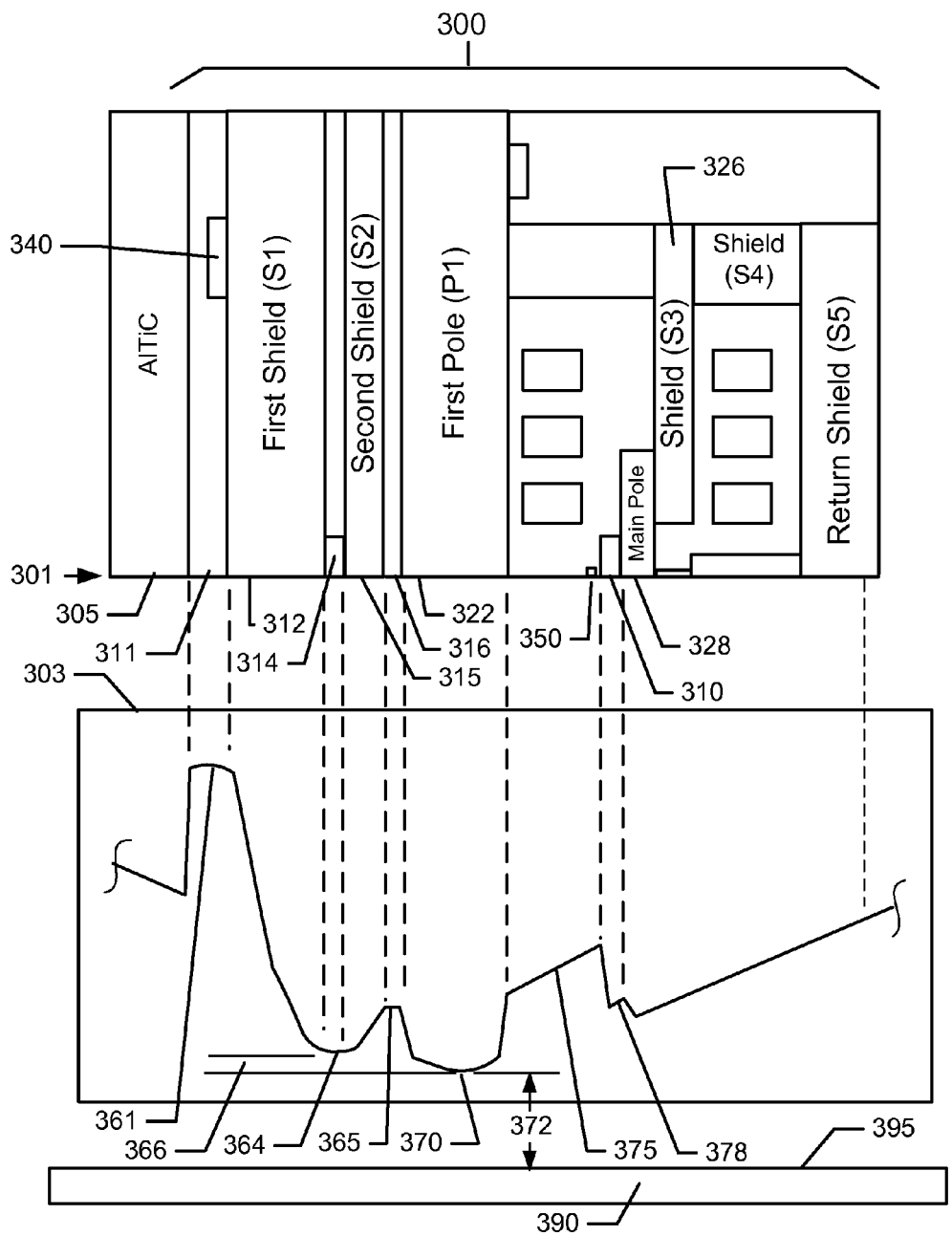
FIG. 3 illustrates a side view of a portion of a perpendicular recording head and a graphic representation of head expansion topography, in accordance with one aspect of the subject invention.

FIG. 3 illustrates PMR head 300 and corresponding thermal protrusion topography 303 with respect to recording media 390. Thermal protrusions illustrated in topography 303 are shown highly exaggerated for clarity. Topography 303 is shown in an operating state of actuation of first heater 340.

PMR head 300 may be formed on a slider portion 305 which may comprise AlTiC. Layer 311 may be an intermediate material such as Al2O3 (alumina). Alumina is an excellent electrical and thermal insulator and has a low coefficient of thermal expansion (CTE). First shield (S1) 312 may be formed of NiFe. NiFe has a higher CTE than alumina and AlTiC. When first heater 340 is actuated, areas surrounding it will begin heating. Since alumina has a low CTE, the thermal expansion of layer 311 in a direction toward the ABS 301 is not as great as that of the nearby layers. Similarly, since S1 312 has a higher CTE, it will experience a large thermal expansion. The different thermal expansion of each layer can be seen in topography 303. Layer 311 experiences only low expansion shown in position 361 of topography 303. Substrate 305 may comprise AlTiC, which has similar CTE to alumina; however, it may be constrained at the interface with spacer layer 211 due to the intimate adhesion between the layers and the high elastic modulus of layer 311 compared to S1 312. S1 therefore has high thermal actuation toward the ABS as shown in position 364 of topography 303. The trailing side of second shield (S2) 315 has a reduction of expansion shown in position 365 of topography 303. This reduction of expansion may be in part due to the effect of interlayer 316, which may be made of alumina, which has a lower CTE, higher elastic modulus, and may include an unprotruded surface topography in the initial profile.

Expansion of S2 315 in a direction toward ABS 301 may be limited by controlling its thickness. Controlling the maximum thickness of S2 315 has the effect of reducing thermal conduction in a direction toward the ABS 301, and also has the effect of improving thermal conduction through S2 315 and layer 316 to P1 322. In addition, the distance from first heater 340 to the ABS 301 may be very large compared to the distance from first heater 340 to P1 322, thereby causing a large thermal energy to pass to P1 322. In order to cause P1 322 to have greater thermal expansion than the area surrounding read transducer 314, the minimum and maximum thickness of P1 322 may be controlled. By controlling the thickness of both S2 315 and P1 322, the thermal expansion at position 370 in topography 303 will be greater than the thermal expansion at both the read sensor 314 at position 364 and S1 312 at position 364 by at least an amount 366. The touchdown point will therefore be constrained to be at position 370, and spacing 372 measured from position 370 to the media 390. The difference in thermal expansion between position 370 and position 364 may also be constrained, thereby protecting read sensor 314 from becoming a first contact point during touchdown actuation.

Thermal expansion in position 375 in topography 303 shows a reduction due to the materials and the distance from heater 340. Materials on the trailing side of P1 322 may include alumina or photoresist, for example. Thermal expansion increases at position 378 due to the thermal conduction through S3 326 to main pole 328, and leading shield 310; but decreases again as the distance from first heater 340 increases. In one embodiment, touchdown sensor 350 may be between P1 322 and S3 326.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention. A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A magnetic recording device comprising:
    a slider comprising an air bearing surface (ABS), a leading side, and a trailing side;
    a head residing on the slider, the head comprising:
        a first magnetic transducer;
        a first heater for heating an area proximal to the first magnetic transducer;
        a first shield (S1) comprising a first material on the leading side of the first magnetic transducer;
        a second shield (S2) comprising the first material on the trailing side of the first magnetic transducer;
        a first pole (P1) comprising the first material on the trailing side of the second shield (S2), wherein the first pole (P1) is between 0.6 micron and 2.0 micron thick, and the second shield (S2) is less than 0.6 micron thick;
        a third shield (S3) on the trailing side of the first pole (P1); and
        a proximity sensor for sensing proximity to a recording media in an area proximal to the first pole (P1), wherein the proximity sensor is between the first pole (P1) and the third shield (S3).

2. The magnetic recording device of claim 1 wherein the second shield (S2) is less than 0.3 micron thick.

3. The magnetic recording device of claim 1 wherein the second shield (S2) is less than one-half the thickness of the first pole (P1).

4. The magnetic recording device of claim 1 wherein the first material comprises NiFe.

5. The magnetic recording device of claim 4 wherein iron comprises between 17% and 23% of the first material.

6. The magnetic recording device of claim 1 wherein the first heater is on the leading side of the first shield (S1).

7. The magnetic recording device of claim 6 further comprising a second heater on the trailing side of the first pole (P1).

8. The magnetic recording device of claim 1 wherein the magnetic transducer is a read transducer.

9. The magnetic recording device of claim 1 wherein the slider comprises AlTiC.

10. A hard disk drive (HDD) comprising
    a slider comprising an air bearing surface (ABS), a leading side, and a trailing side;
    a magnetic recording head residing on the slider, the magnetic recording head comprising:
        a first magnetic transducer;
        a first heater for heating an area proximal to the first magnetic transducer;
        a first shield (S1) comprising a first material on the trailing side of the first magnetic transducer, the first heater on the leading side of the first shield (S1);
        a second shield (S2) comprising the first material on the leading side of the first magnetic transducer;
        a first pole (P1) comprising the first material on the trailing side of the second shield (S2), wherein; the first pole (P1) is between 0.6 micron and to 2.0 micron thick, and the second shield (S2) is less than 0.6 micron thick; and
        a second heater on the trailing side of the first pole (P1).

11. The hard disk drive (HDD) of claim 10 wherein the second shield (S2) is less than 0.3 micron thick.

12. The hard disk drive (HDD) of claim 10 wherein the second shield (S2) is less than one-half the thickness of the first pole (P1).

13. The hard disk drive (HDD) of claim 10 wherein the first material comprises NiFe.

14. The magnetic recording device of claim 13 wherein iron comprises between 17% and 23% of the first material.

15. The hard disk drive (HDD) of claim 10 wherein the magnetic transducer is a read transducer.

16. The hard disk drive (HDD) of claim 10 comprising:
    a third shield (S3) on the trailing side of the first pole (P1);
    a proximity sensor for sensing proximity to a recording media in an area proximal to the first pole (P1), wherein the proximity sensor is between the first pole (P1) and the third shield (S3).

17. The hard disk drive (HDD) of claim 10 wherein the slider comprises AlTiC.

* * * * *